US012684399B2

(12) United States Patent
Jia et al.

(10) Patent No.: US 12,684,399 B2
(45) Date of Patent: Jul. 14, 2026

(54) MANAGING ENERGY CONSUMPTION IN A TRAFFIC-AWARE MANNER

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 387 days.

(21) Appl. No.: 18/476,287

(22) Filed: Sep. 27, 2023

(65) Prior Publication Data

US 2025/0106674 A1      Mar. 27, 2025

(51) Int. Cl.
H04W 24/08      (2009.01)
H04W 28/02      (2009.01)
(52) U.S. Cl.
CPC ....... H04W 28/0221 (2013.01); H04W 24/08 (2013.01)
(58) Field of Classification Search
CPC .......................... H04W 24/08; H04W 28/0221
See application file for complete search history.

(56) References Cited

U.S. PATENT DOCUMENTS

| | | | |
|---|---|---|---|
| 2013/0173947 A1* | 7/2013 | Nomura .............. | G06F 11/3062 |
| | | | 713/340 |
| 2015/0009815 A1* | 1/2015 | Hsu ....................... | H04W 76/28 |
| | | | 370/230.1 |
| 2016/0330011 A1* | 11/2016 | Lee ..................... | H04W 52/243 |
| 2019/0281494 A1* | 9/2019 | Chan ..................... | H04L 45/851 |
| 2020/0052865 A1* | 2/2020 | Liou ..................... | H04W 24/08 |
| 2021/0212044 A1* | 7/2021 | Ryu .................. | H04W 72/0453 |
| 2021/0219304 A1* | 7/2021 | Xu ......................... | H04L 5/0073 |
| 2023/0101393 A1* | 3/2023 | Dai ....................... | H04W 72/23 |
| | | | 726/6 |
| 2023/0239793 A1* | 7/2023 | Lin ................... | H04W 52/0216 |
| | | | 370/311 |
| 2023/0328642 A1* | 10/2023 | Yanggratoke ..... | H04W 52/0203 |
| | | | 455/574 |

* cited by examiner

*Primary Examiner* — Kevin T Bates
*Assistant Examiner* — Hector Reyes

(57)      ABSTRACT

A method for managing energy consumption in a traffic-aware manner includes monitoring a level of network traffic in a wireless network to which a plurality of user devices is connected, detecting, based on the monitoring, that a current level of traffic in the wireless network has exceeded a predefined threshold level of traffic, selecting, in response to the detecting, a subset of the plurality of user devices to put into an energy saving mode, and sending, to each user device in the subset, a signaling message, where the signaling message instructs the each user device to mute, for a defined number of symbols, at least one of: a transmit capability of the each user device or a receive capability of the each user device.

20 Claims, 4 Drawing Sheets

200

200

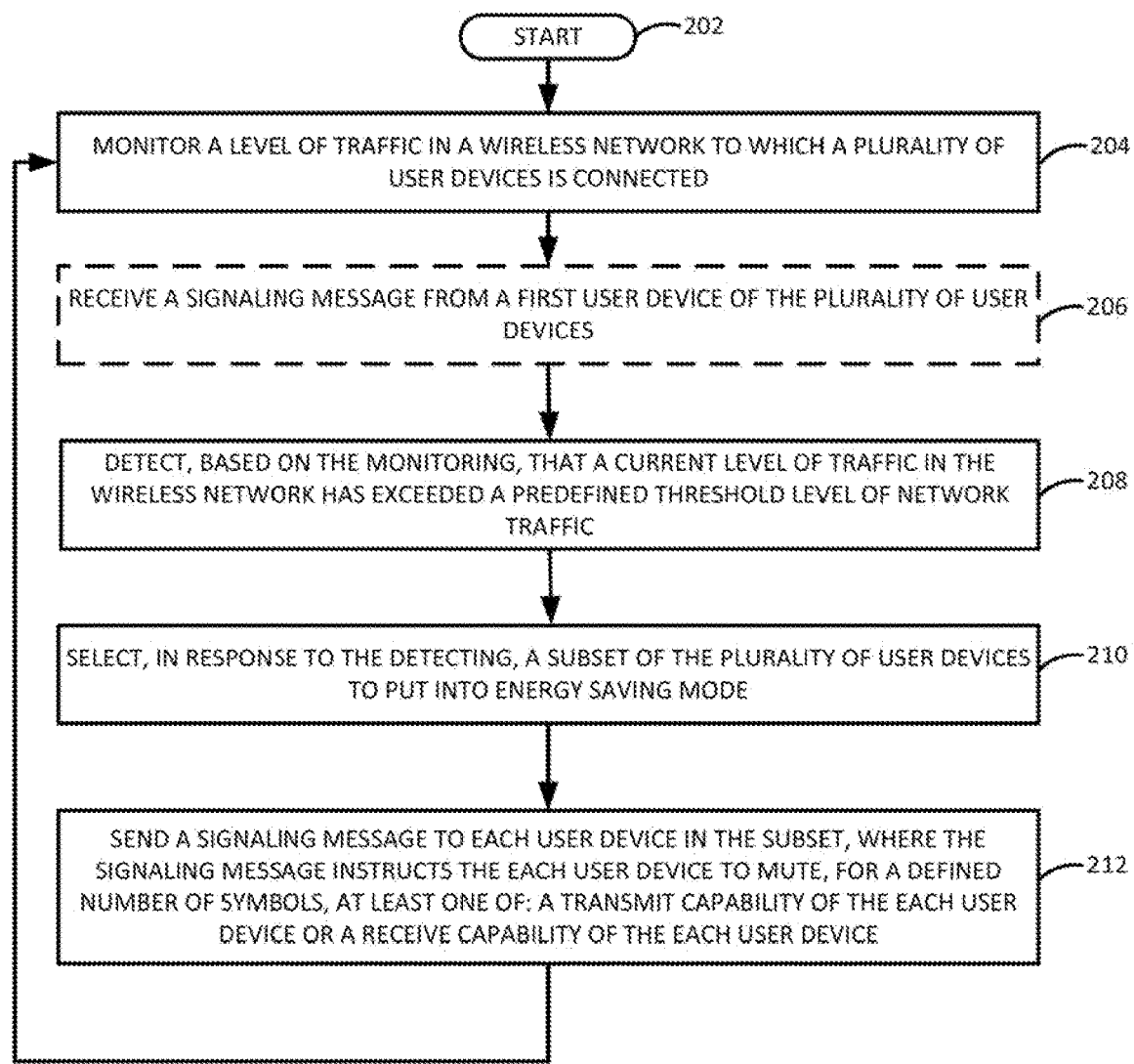

START ~202

MONITOR A LEVEL OF TRAFFIC IN A WIRELESS NETWORK TO WHICH A PLURALITY OF USER DEVICES IS CONNECTED ~204

RECEIVE A SIGNALING MESSAGE FROM A FIRST USER DEVICE OF THE PLURALITY OF USER DEVICES ~206

DETECT, BASED ON THE MONITORING, THAT A CURRENT LEVEL OF TRAFFIC IN THE WIRELESS NETWORK HAS EXCEEDED A PREDEFINED THRESHOLD LEVEL OF NETWORK TRAFFIC ~208

SELECT, IN RESPONSE TO THE DETECTING, A SUBSET OF THE PLURALITY OF USER DEVICES TO PUT INTO ENERGY SAVING MODE ~210

SEND A SIGNALING MESSAGE TO EACH USER DEVICE IN THE SUBSET, WHERE THE SIGNALING MESSAGE INSTRUCTS THE EACH USER DEVICE TO MUTE, FOR A DEFINED NUMBER OF SYMBOLS, AT LEAST ONE OF: A TRANSMIT CAPABILITY OF THE EACH USER DEVICE OR A RECEIVE CAPABILITY OF THE EACH USER DEVICE ~212

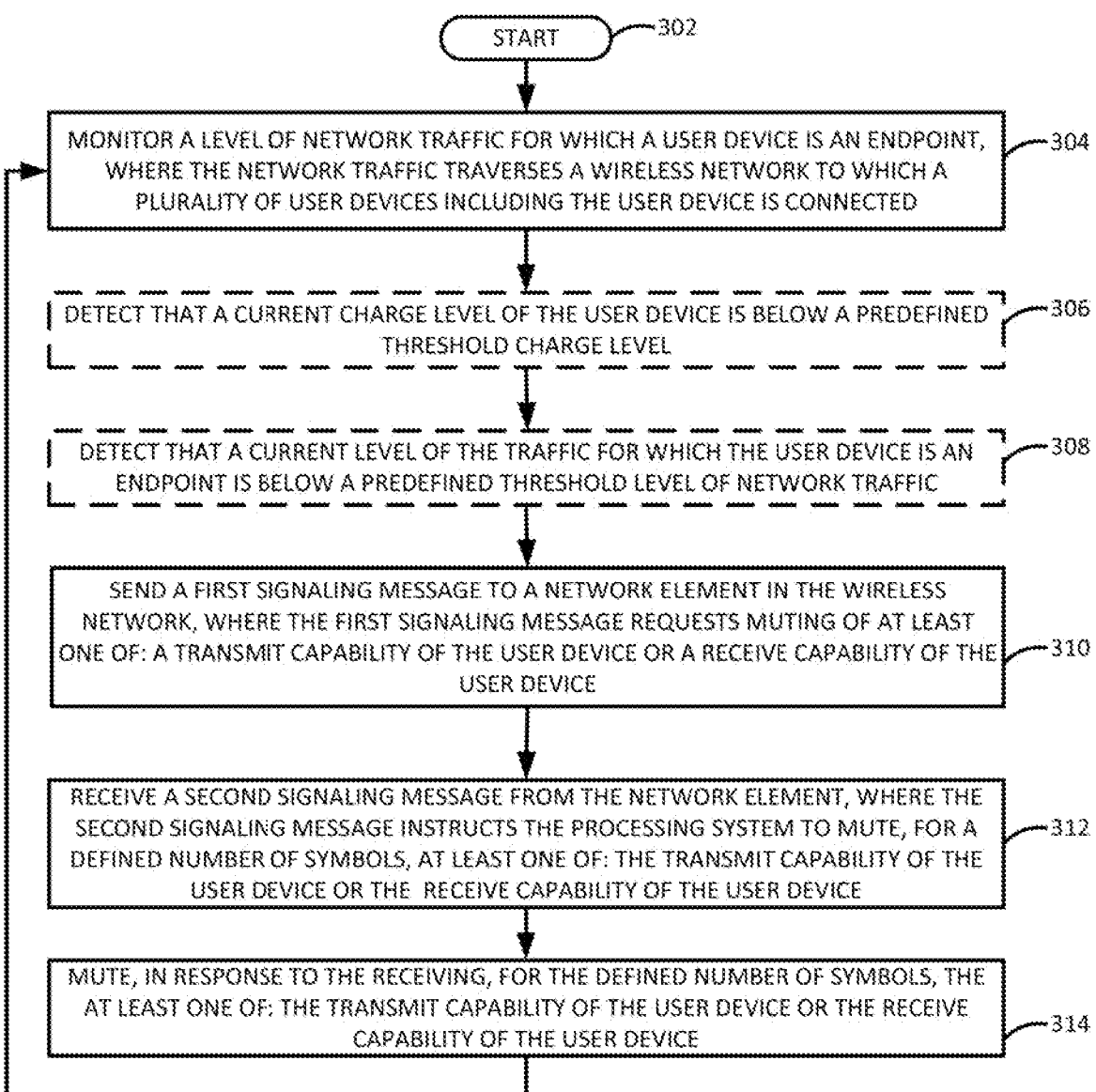

START ~302

MONITOR A LEVEL OF NETWORK TRAFFIC FOR WHICH A USER DEVICE IS AN ENDPOINT, WHERE THE NETWORK TRAFFIC TRAVERSES A WIRELESS NETWORK TO WHICH A PLURALITY OF USER DEVICES INCLUDING THE USER DEVICE IS CONNECTED ~304

DETECT THAT A CURRENT CHARGE LEVEL OF THE USER DEVICE IS BELOW A PREDEFINED THRESHOLD CHARGE LEVEL ~306

DETECT THAT A CURRENT LEVEL OF THE TRAFFIC FOR WHICH THE USER DEVICE IS AN ENDPOINT IS BELOW A PREDEFINED THRESHOLD LEVEL OF NETWORK TRAFFIC ~308

SEND A FIRST SIGNALING MESSAGE TO A NETWORK ELEMENT IN THE WIRELESS NETWORK, WHERE THE FIRST SIGNALING MESSAGE REQUESTS MUTING OF AT LEAST ONE OF: A TRANSMIT CAPABILITY OF THE USER DEVICE OR A RECEIVE CAPABILITY OF THE USER DEVICE ~310

RECEIVE A SECOND SIGNALING MESSAGE FROM THE NETWORK ELEMENT, WHERE THE SECOND SIGNALING MESSAGE INSTRUCTS THE PROCESSING SYSTEM TO MUTE, FOR A DEFINED NUMBER OF SYMBOLS, AT LEAST ONE OF: THE TRANSMIT CAPABILITY OF THE USER DEVICE OR THE RECEIVE CAPABILITY OF THE USER DEVICE ~312

MUTE, IN RESPONSE TO THE RECEIVING, FOR THE DEFINED NUMBER OF SYMBOLS, THE AT LEAST ONE OF: THE TRANSMIT CAPABILITY OF THE USER DEVICE OR THE RECEIVE CAPABILITY OF THE USER DEVICE ~314

MANAGING ENERGY CONSUMPTION IN A TRAFFIC-AWARE MANNER

The present disclosure relates generally to wireless networks, and relates more particularly to devices, non-transitory computer-readable media, and methods for managing energy consumption in a traffic-aware manner in a wireless network.

BACKGROUND

Wireless communication refers to the transfer of data between two or more endpoints without relying on a wired (e.g., electrical conductor, optical fiber, or the like) connection. For instance, wireless communications may include communications that transfer data via radio waves (e.g., mobile broadband, Wi-Fi, Bluetooth, and the like). The demand for wireless communication has increased dramatically with advances in smart phone technology, Internet of Things (IoT) devices, autonomous vehicles, and other applications and devices.

SUMMARY

In one example, the present disclosure describes a device, computer-readable medium, and method for managing energy consumption in a traffic-aware manner in a wireless network. For instance, in one example, a method performed by a processing system including at least one processor includes monitoring a level of network traffic in a wireless network to which a plurality of user devices is connected, detecting, based on the monitoring, that a current level of traffic in the wireless network has exceeded a predefined threshold level of traffic, selecting, in response to the detecting, a subset of the plurality of user devices to put into an energy saving mode, and sending, to each user device in the subset, a signaling message, where the signaling message instructs the each user device to mute, for a defined number of symbols, at least one of: a transmit capability of the each user device or a receive capability of the each user device.

In another example, a non-transitory computer-readable medium stores monitoring a level of network traffic in a wireless network to which a plurality of user devices is connected, detecting, based on the monitoring, that a current level of traffic in the wireless network has exceeded a predefined threshold level of traffic, selecting, in response to the detecting, a subset of the plurality of user devices to put into an energy saving mode, and sending, to each user device in the subset, a signaling message, where the signaling message instructs the each user device to mute, for a defined number of symbols, at least one of: a transmit capability of the each user device or a receive capability of the each user device.

In another example, a system includes a processing system including at least one processor and a non-transitory computer-readable medium storing instructions which, when executed by the processing system, cause the processing system to perform operations. The operations include monitoring a level of network traffic in a wireless network to which a plurality of user devices is connected, detecting, based on the monitoring, that a current level of traffic in the wireless network has exceeded a predefined threshold level of traffic, selecting, in response to the detecting, a subset of the plurality of user devices to put into an energy saving mode, and sending, to each user device in the subset, a signaling message, where the signaling message instructs the each user device to mute, for a defined number of symbols, at least one of: a transmit capability of the each user device or a receive capability of the each user device.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for managing energy consumption in a traffic-aware manner;

FIG. 3 illustrates a flowchart of an example method for managing energy consumption in a traffic-aware manner.

To facilitate understanding, identical reference numerals have been used, where possible, to designate identical elements that are common to the figures.

DETAILED DESCRIPTION

In one example, the present disclosure provides a system, method, and non-transitory computer readable medium for managing energy consumption in a traffic-aware manner. As discussed above, the demand for wireless communication has increased dramatically with advances in smart phone technology, Internet of Things (IoT) devices, autonomous vehicles, and other applications and devices. However, transferring data via wireless communication tends to consume a great deal of energy, both on the user device side and on the network side, and this energy consumption is expected to increase exponentially with the deployment of Fifth Generation (5G) cellular technology. For instance, user devices as well as devices within the wireless network (e.g., base stations and other network elements) may constantly consume energy, even when not actively transmitting or receiving data. This unnecessary consumption of energy may have catastrophic environmental effects, since wireless networks are not typically powered by renewable energy sources. Moreover, most user devices in wireless networks are battery-powered; in this case, unnecessary energy consumption can also reduce the battery life of the user devices.

Most conventional solutions for conserving energy in wireless networks reduce energy consumption on either the user device side or on the network side, but not on both. Examples of the present disclosure, however, simultaneously reduce energy consumption on both the user device side and on the network side by utilizing novel signaling messages to mute user device transmit and/or receive capabilities for a specified number of symbols or physical resource blocks (PRBs). The number of symbols or PRBs for which the capabilities are muted may be dynamically adjusted in response to real-time user activity in the wireless network.

In long term evolution (LTE) networks, an LTE transmission may comprise a plurality of radio frames, where each radio frame has a duration of ten milliseconds. Each frame may, in turn, be divided into ten one-millisecond subframes, and each subframe may be further divided into two 0.5 millisecond slots. Each slot contains seven symbols each having a duration of 66.7 microseconds, where a "symbol"

is understood, within the context of the present disclosure, to refer to the smallest unit of time in an LTE frame.

A "physical resource block" or "PRB" is understood, within the context of the present disclosure, to refer to a unit of an LTE frame that comprises one slot (and, hence, seven symbols) and twelve consecutive subcarriers, where a subcarrier is the smallest unit of frequency in the LTE frame. A PRB is also the smallest unit of resources that can be allocated to a user. These and other aspects of the present disclosure are discussed in further detail with reference to FIGS. 1-4, below.

Figure 1:
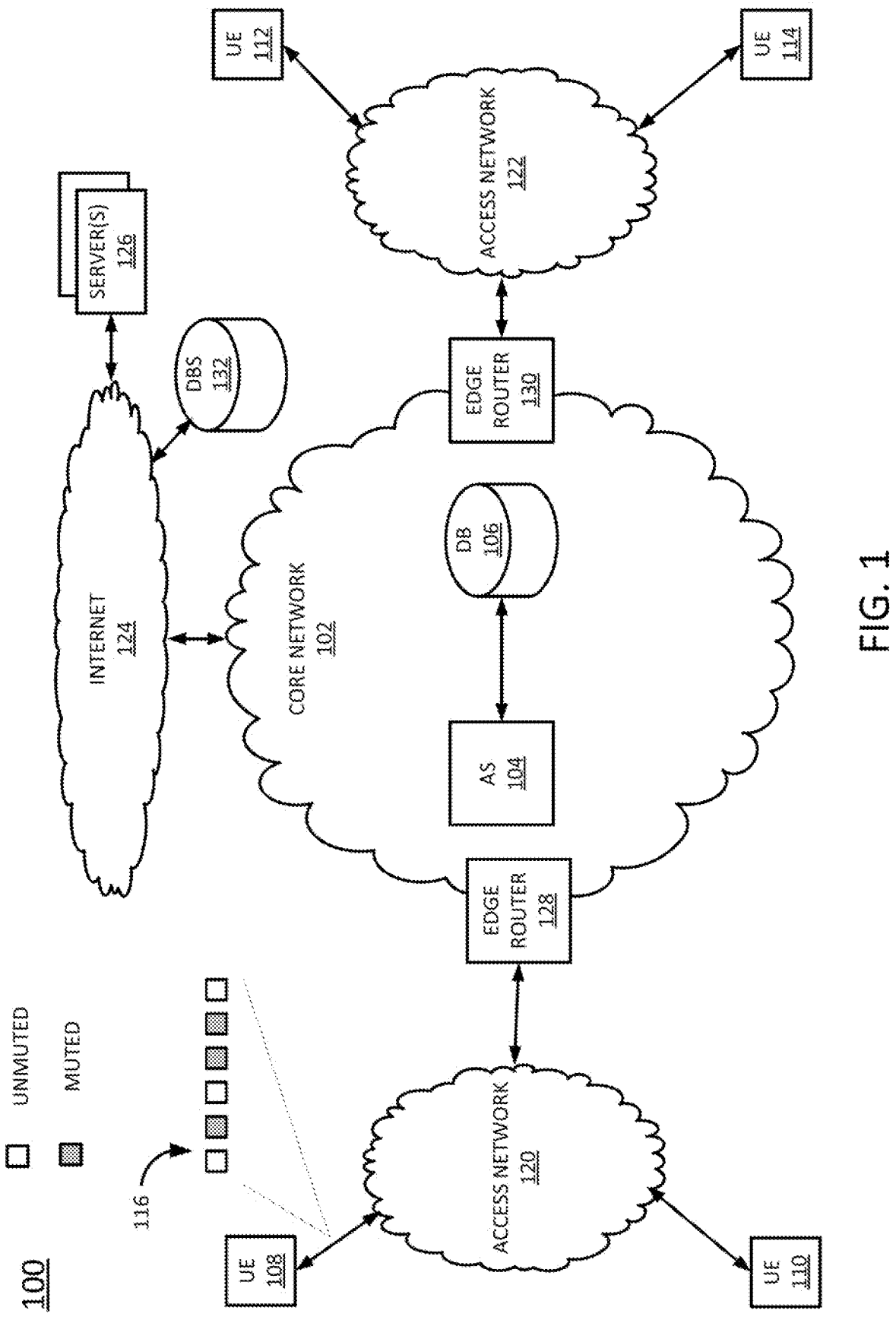
FIG. 1 illustrates an example system in which examples of the present disclosure for managing energy consumption in a traffic-aware manner may operate.

To further aid in understanding the present disclosure, FIG. 1 illustrates an example system 100 in which examples of the present disclosure for managing energy consumption in a traffic-aware manner may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a smart phone, a tablet computer, a laptop computer, a gaming device, a wearable smart device (e.g., a smart watch, a fitness tracker, a health monitor, a head mounted display, or the like), an IoT device (e.g., an Internet-enabled thermostat, an Internet-enabled security system, or the like), an autonomous vehicle (e.g., a vehicle that either fully controls its own operation or operates on a reduced level of human input), a global positioning system (GPS) device, a drone, a bank or cluster of such devices, and the like. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. Thus, some of the servers 126 and DBs 132 may host applications including video conferencing applications, extended reality (e.g., virtual reality, augmented reality, mixed reality, and the like) applications, immersive gaming applications, and the like. In one example, at least some of the servers 126 and DBs 132 host applications that manage energy consumption within the system 100 and by the user endpoint devices 108, 110, 112, and 114.

In accordance with the present disclosure, the AS 104 may be configured to provide one or more operations or functions in connection with examples of the present disclosure for managing energy consumption in a traffic-aware manner, as described herein. For instance, in one example, the AS 104 may monitor a level of traffic in the system 100 and may detect when the level of traffic exceeds (or falls below) a first predefined threshold level of network traffic. The AS 104 may also receive signaling messages from one or more of the user endpoint devices 108, 110, 112, and 114 containing requests to temporarily mute the transmit and/or receive capabilities of the one or more user endpoint devices 108, 110, 112, and 114. For instance, the one or more user endpoint devices 108, 110, 112, and 114 may detect that the level of network traffic for which it is an endpoint falls below or is expected to fall below a second predefined threshold level of network traffic (e.g., indicating relative inactivity of the one or more user endpoint devices 108, 110, 112, and 114) or may detect that its charge level falls below a predefined threshold charge level (e.g., indicating a likelihood of battery depletion within some defined period of time).

Based on the level of network traffic and/or the signaling messages received from the one or more user endpoint devices 108, 110, 112, and 114, the AS 104 may determine that a subset of the user endpoint devices 108, 110, 112, and 114 should be put into an energy saving mode. The AS 104 may send a signaling message to each user endpoint device 108, 110, 112, and 114 in the subset. The signaling message may indicate whether the each user endpoint device 108, 110, 112, and 114 should mute its transmit capability, its receive capability, or both its transmit capability and its receive capability. The signaling message may further indicate a number of symbols 116 (broadly some units of time) for which the indicated capability or capabilities should be muted.

Figure 4:
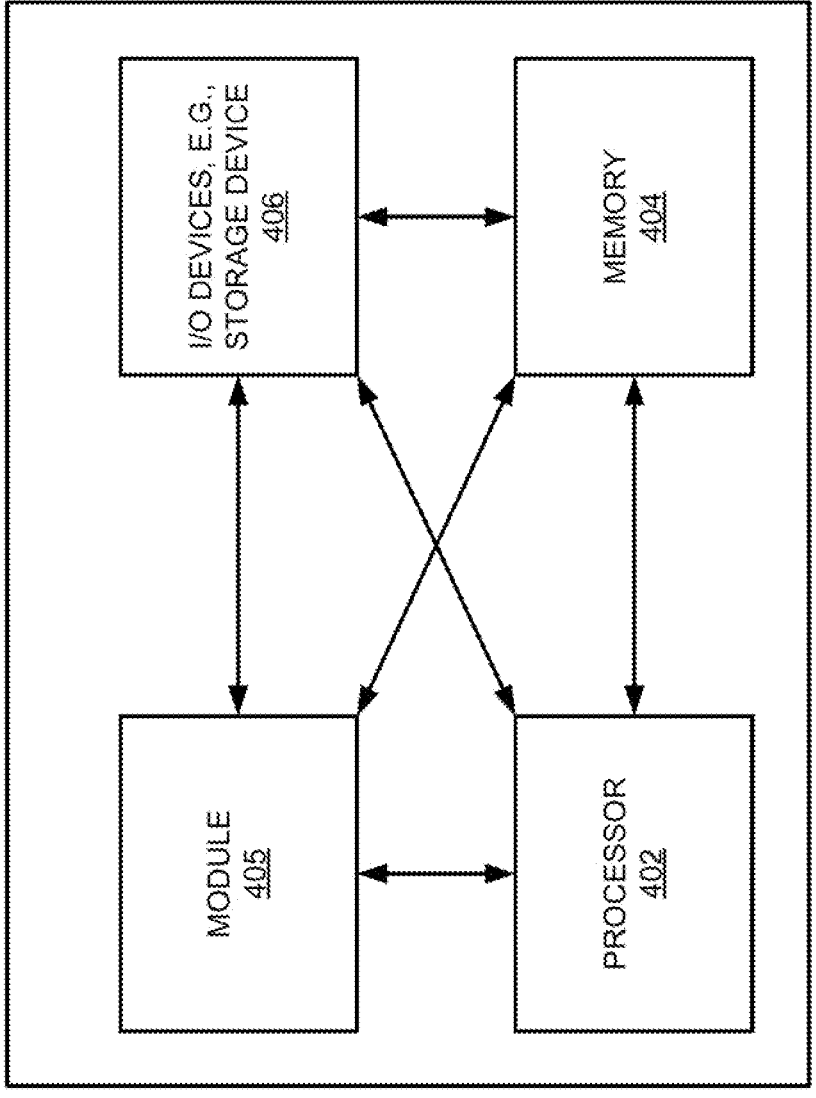
FIG. 4 depicts a high-level block diagram of a computing device specifically programmed to perform the functions described herein.

The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the DB 106 may store one or more threshold levels of network traffic. The one or more threshold levels of network traffic may represent levels of network traffic that, when observed in the system 100, should cause the AS 104 to put one or more of the user endpoint devices 108, 110, 112, and 114 into an energy saving mode. In one example, different threshold levels of network traffic may be defined for different times of day, different days of the week, holidays, special events, or the like. For instance, the threshold level of network traffic may be higher on weekends that on weekdays, or lower between 12:00 AM and 7:00 AM local time than between 7:01 AM and 11:59 AM local time. In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for communicating maximum values for managing energy consumption in a traffic-aware manner, as described herein. For instance, example methods for managing energy consumption in a traffic-aware manner are discussed in further detail below in connection with FIGS. 2 and 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

To further aid in understanding the present disclosure, FIG. 2 illustrates a flowchart of an example method 200 for managing energy consumption in a traffic-aware manner. In one example, the method 200 may be performed by the AS 104, one of the edge routers 128 and 130, or by another element of the core network 102 illustrated in FIG. 1. However, in other examples, the method 200 may be performed by another device, such as the computing system 400 of FIG. 4, discussed in further detail below. For the sake of discussion, the method 200 is described below as being performed by a processing system (where the processing system may comprise a component of the AS 104, one of the edge routers 128 and 130, or by another element of the core network 102, the computing system 400, or another device).

The method 200 begins in step 202.

In step 204, the processing system may monitor a level of network traffic in a wireless network to which a plurality of user devices is connected.

In one example, the wireless network may comprise a RAN (e.g., a 5G network, and LTE network, or the like), and the processing system may be part of a network element (e.g., a server, an edge router, or the like) that resides in the wireless network. That is, the processing system may be part of a network element maintained and operated by an operator of the wireless network.

In one example, the plurality of user devices may include, for instance, smart phones, tablet computers, laptop computers, gaming devices, wearable smart devices (e.g., smart watches, fitness trackers, health monitors, head mounted displays, or the like), IoT devices (e.g., Internet-enabled thermostats, Internet-enabled security systems, or the like), autonomous vehicles (e.g., vehicles that either fully control their own operation or operate on a reduced level of human input), global positioning system (GPS) devices, drones, or the like.

In one example, a user device that is connected to the wireless network may send data to and receive data from other user devices that are connected to the wireless network, via the wireless network. Thus, any communications sent or received by a user device that is connected to the wireless network may traverse the wireless network. A user device that is connected to the wireless network may also send data to and receive data from devices within the wireless network itself, such as base stations, servers, and other network elements.

In optional step 206 (illustrated in phantom), the processing system may receive a signaling message (e.g., a first signaling message) from a first user device of the plurality of user devices connected to the wireless network.

In one example, the signaling message may be sent by the first user device to indicate a request to mute the first user device's receive and/or transmit capabilities for a defined number of symbols. In one example, the first user device may send the signaling message to the processing system when the first user device detects that an expected usage of the wireless network by the first user device for a future period of time is expected to fall below a predefined threshold usage. In one example, the threshold usage may be zero (i.e., the first user device does not expect to transmit and/or receive any data via the wireless network for the future period of time). In another example, the first user device may send the signaling message to the processing system when the first user device detects that its battery or charge level is below a predefined threshold battery or charge level.

In one example, the signaling message includes a plurality of fields. The plurality of fields may include a first field that contains data that indicates whether the first user device requests muting of its transmit capabilities, its receive capabilities, or both its transmit capabilities and its receive capabilities. For instance, a first value inserted into the first field may indicate that the first user device is requesting muting of its transmit capabilities, a second value inserted into the first field may indicate that the first user device is requesting muting of its receive capabilities, and a third value inserted into the first field may indicate that the first user device is requesting muting of its transmit capabilities and its receive capabilities.

The plurality of fields may also include a second field. The second field may contain data that indicates a duration for which the first user device is requesting muting of the capabilities indicated in the first field. For instance, a value inserted into the second field may comprise a numeric value that corresponds to a number of symbols (broadly a number of units of time) for which the first user device is requesting muting of the capability. In one example, the number of symbols may be determined by the first user device based on a level of transmit and/or receive activities that the first user device expects to engage in via the wireless network during a future period of time. In one example, the first user device may utilize a machine learning technique (e.g., a support vector machine, a neural network, a decision tree, a linear regression model, or the like) that learns patterns of usage of the first user device. For instance, the machine learning technique may learn that the amount or rate of data transmitted by the first user device during a particular time of day (e.g., 11:00 PM Eastern time to 7:00 AM Eastern time) is almost always below a predefined threshold amount or rate of data. Similarly, the machine learning technique may learn that when a parental control feature is enabled on the first user device (e.g., preventing the first user device from accessing streaming media applications), the amount or rate of data received by the first user device is almost always below a predefined threshold amount or rate of data.

The plurality of fields may also include a third field. The third field may contain data that allows the processing system to verify the authenticity of the signaling message. For instance, a value inserted into the third field may comprise a predefined value, a key, a hash, or a token that is known to both the processing system and the first user device.

In step 208, the processing system may detect, based on the monitoring, that a current level of traffic in the wireless network has exceeded a predefined threshold level of traffic.

For instance, in one example, a predefined threshold level of network traffic may represent a maximum level of network traffic that the wireless network may carry before implementing an energy saving policy that involves instructing at least some wireless devices connected to the network to temporarily mute their transmit and/or receive capabilities.

In one example, the predefined threshold level of network traffic may be expressed as a maximum number of data packets simultaneously traversing the wireless network at any given instant in time (e.g., x data packets), as a maximum average number of data packets traversing the wireless network per unit of time over a window of time (e.g., y packets per second over a window of z seconds), or in another manner.

In step 210, the processing system may select, in response to the detecting, a subset of the plurality of user devices to put into an energy saving mode.

In one example, the subset may contain a single user device. In another example, the subset may contain a plurality of (i.e., at least two) user devices.

In one example, the subset may contain at least one user device that has requested to be put into energy saving mode. For instance, the processing system may have received a signaling message from the at least one user device in step 206. In one example, when selecting the subset of the plurality of user devices to put into energy saving mode, the processing system may prioritize selecting user devices that have requested to be put into energy saving mode. That is, the processing system may select user devices that have requested to be put into energy saving mode before selecting other user devices (which may not have requested to be put into energy saving mode) as part of the subset. In one example, a user device which has not requested to be put into energy saving mode may be selected as part of the subset if the processing system determines that usage of the wireless network by the user device for a future period of time is expected to fall below a threshold usage or if data indicates that a battery or charge level of the user device is below a predefined threshold battery or charge level.

In one example, the processing system may determine that certain devices should not or should never be put into the energy saving mode, regardless of the current level or network traffic and the current activities in which the certain devices are engaged. For instance, Internet-enabled devices that monitor critical medical information (e.g., Internet-enabled insulin pumps, Internet-enabled blood glucose monitors, Internet-enabled heart rate monitors, Internet-enabled respiration monitors, Internet-enabled blood pressure monitors, Internet-enabled blood alcohol content sensors, or the like) may require that their transmit and receive capabilities are always available and never muted. Such devices may be identified as exempt from consideration in step 210.

In step 212, the processing system may send a signaling message (e.g., a second signaling message) to each user device in the subset, where the signaling message instructs the each user device to mute, for a defined number of symbols, at least one of: a transmit capability of the each user device or a receive capability of the each user device.

In one example, the signaling message includes a plurality of fields. The plurality of fields may include a first field that contains data that indicates whether the each user device should mute its transmit capabilities, its receive capabilities, or both its transmit capabilities and its receive capabilities. For instance, a first value inserted into the first field may indicate that the transmit capabilities should be muted, a second value inserted into the first field may indicate that the receive capabilities should be muted, and a third value inserted into the first field may indicate that the transmit capabilities and the receive capabilities should be muted.

The plurality of fields may also include a second field. The second field may contain data that indicates a duration for which the capabilities indicated in the first field should be muted. For instance, a value inserted into the second field may comprise a numeric value that corresponds to a number of symbols (broadly a number of units of time) for which the capability should be muted.

The plurality of fields may also include a third field. The third field may contain data that allows the each user device to verify the authenticity of the signaling message. For instance, a value inserted into the third field may comprise a predefined value, a key, a hash, or a token that is known to both the processing system and the each user device.

In one example, the defined number of symbols may be determined by the processing system based on the current level of network traffic and/or on expected usage of the wireless network by each user device in the subset for a future period of time (e.g., as determined based on any activities in which the each user device is currently engaged in the wireless network and/or on any requests received from each user device in the subset to be put into energy saving mode. In one example, the processing system may utilize a machine learning technique (e.g., a support vector machine, a neural network, a decision tree, a linear regression model, or the like) that takes as inputs the current level of network traffic and the expected usage of the wireless network by each user device in the subset for a future period of time and generates as an output the defined number of symbols, where the defined number of symbols comprises a number of symbols for which the transmit and/or receive capabilities of the each user device in the subset may be muted without the quality of experience of the each user device in the subset falling below a predefined threshold quality of experience.

As discussed above, in one example, the subset may contain a single user device. In another example, the subset may contain a plurality of (i.e., at least two) user devices. In one example, where the subset contains a plurality of user devices, each of the user devices may be instructed to mute its transmit and/or receive capabilities for the same number of symbols (e.g., all user devices in the subset mute their transmit and/or receive capabilities for x symbols). In another example, where the subset contains a plurality of user devices, at least two of the user devices in the subset may be instructed to mute their transmit and/or receive capabilities for different number of symbols (e.g., a first user device mutes its transmit and/or receive capabilities for x symbols, a second user device mutes its transmit and/or receive capabilities for y symbols, where x and y are different values, and so on).

In a further example, the signaling message may further direct the subset to a low frequency band or slice of the wireless network (e.g., a frequency band or slice of the wireless network that is of a lower frequency or lower priority than a frequency band or slice of the network to which the subset is currently connected) in order to further reduce energy consumption.

The method 200 may then return to step 204, and the processing system may proceed as described above to continue monitoring the level of traffic in the wireless network and selecting user devices to put into energy saving mode when the level of network traffic exceeds the predefined threshold level of network traffic.

FIG. 3 illustrates a flowchart of an example method 300 for managing energy consumption in a traffic-aware manner. In one example, the method 300 may be performed by a user device, such as one of user devices 108-114 illustrated in FIG. 1. However, in other examples, the method 300 may be performed by another device, such as the computing system 400 of FIG. 4, discussed in further detail below. For the sake of discussion, the method 300 is described below as being performed by a processing system (where the processing system may comprise a component of a user device, the computing system 400, or another device).

The method 300 begins in step 302.

In step 304, the processing system may monitor a level of network traffic for which a user device is an endpoint, where the network traffic traverses a wireless network to which a plurality of user devices including the user device is connected.

In one example, the processing system may be part of the user device, and the user device may be, for instance, a smart phone, a tablet computer, a laptop computer, a gaming device, a wearable smart device (e.g., a smart watch, a fitness tracker, a health monitor, a head mounted display, or the like), an IoT device (e.g., an Internet-enabled thermostat, an Internet-enabled security system, or the like), an autonomous vehicle (e.g., a vehicle that either fully controls its own operation or operates on a reduced level of human input), a global positioning system (GPS) device, a drone, or the like.

In one example, the wireless network may comprise a RAN (e.g., a 5G network, and LTE network, or the like). In one example, the user device may send data to and receive data from other user devices that are connected to the wireless network, via the wireless network. Thus, any communications sent or received by the user device may traverse the wireless network. The user device may also send data to and receive data from devices within the wireless network itself, such as base stations, servers, and other network elements.

As such, the level of network traffic for which the user device is an endpoint may comprise any network traffic that the user device exchanges with other user devices via the wireless network and/or with network elements of the wireless network. In one example, the level of network traffic may be expressed as a number of data packets simultaneously sent and received by the user device via the wireless network at any given instant in time (e.g., x data packets), as an average number of data packets sent and received by the user device via the wireless network per unit of time over a window of time (e.g., y packets per second over a window of z seconds), or in another manner.

In step 306, the processing system may detect that a charge (e.g., battery) level of the user device is below a predefined threshold charge level.

For instance, in one example, when the user device's charge level falls below the threshold charge level, the user device may need to limit the amount of data that the user device sends and/or receives via the wireless network in order to conserve charge and minimize the rate at which the charge level is depleted. In one example, the predefined threshold charge level may vary based on an activity in which the user device is currently engaged. For instance, if the user device is currently executing a navigation application, then the predefined threshold charge level may be relatively low in order to allow the navigation application to finish navigating a user of the user device to a desired location. However, if the user device is currently executing a streaming media (e.g., music or video) application or a gaming application, then the predefined threshold charge level may be higher, since limiting availability of the streaming media application or gaming application is not likely to create a situation in which the user's safety is at risk.

In step 308, the processing system may detect that a current level of the network traffic for which the user device is an endpoint is below a predefined threshold level of network traffic.

For instance, in one example, a predefined threshold level of network traffic may represent a minimum level of network traffic for which the user device may be an endpoint without implementing an energy saving policy that involves temporarily muting at least one of the user device's transmit and/or receive capabilities. In one example, the predefined threshold level of network traffic may be expressed as a minimum number of data packets simultaneously sent and received by the user device at any given instant in time (e.g., x data packets), as a minimum average number of data packets sent and received by the user per unit of time over a window of time (e.g., y packets per second over a window of z seconds), or in another manner.

In step 310, the processing system may send a first signaling message to a network element in the wireless network, where the first signaling message requests muting of at least one of: a transmit capability of the user device or a receive capability of the wireless device.

In one example, the first signaling message may request muting of the user device's transmit and/or receive capabilities for a defined number of symbols.

In one example, the processing system may send the first signaling message to the network element when the processing system infers, based on the current level of network traffic for which the user device is an endpoint, that an expected usage of the wireless network by the user device for a future period of time is expected to fall below a threshold usage. In one example, the threshold usage may be zero (i.e., the processing system does not expect the user device to transmit and/or receive any data via the wireless network for the future period of time). The processing system may utilize a machine learning technique (e.g., a support vector machine, a neural network, a decision tree, a linear regression model, or the like) in order to infer the usage of the wireless network by the user device based on the current level of network traffic for which the user device is an endpoint.

In another example, the processing may send the first signaling message to the processing system when the processing system device detects that the charge level of the user device is below the predefined threshold charge level.

In one example, the first signaling message includes a plurality of fields. The plurality of fields may include a first field that contains data that indicates whether the processing system requests muting of the user device's transmit capabilities, receive capabilities, or both the transmit capabilities and the receive capabilities. For instance, a first value inserted into the first field may indicate that the processing system is requesting muting of the user device's transmit capabilities, a second value inserted into the first field may indicate that the processing system is requesting muting of the user device's receive capabilities, and a third value inserted into the first field may indicate that the processing system is requesting muting of the user device's transmit capabilities and receive capabilities.

The plurality of fields may also include a second field. The second field may contain data that indicates a duration for which the processing system is requesting muting of the capabilities indicated in the first field. For instance, a value inserted into the second field may comprise a numeric value that corresponds to a number of symbols (broadly a number of units of time) for which the processing system is requesting muting of the capability. In one example, the number of symbols may be determined by the processing system based on a level of transmit and/or receive activities that the processing system expects the user device to engage in via the wireless network during a future period of time. In one example, the processing system may utilize a machine learning technique (e.g., a support vector machine, a neural network, a decision tree, a linear regression model, or the like) that learns patterns of usage of the user device. For instance, the machine learning technique may learn that the amount or rate of data transmitted by the user device during a particular time of day (e.g., 11:00 PM Eastern time to 7:00 AM Eastern time) is almost always below a predefined threshold amount or rate of data. Similarly, the machine learning technique may learn that when a parental control feature is enabled on the user device (e.g., preventing the user device from accessing streaming media applications), the amount or rate of data received by the user device is almost always below a predefined threshold amount or rate of data.

The plurality of fields may also include a third field. The third field may contain data that allows the network element to verify the authenticity of the first signaling message. For instance, a value inserted into the third field may comprise a predefined value, a key, a hash, or a token that is known to both the processing system and the network element.

In step 312, the processing system may receive a second signaling message from the network element, where the second signaling message instructs the processing system to mute, for a defined number of symbols, at least one of: the transmit capability of the user device or the receive capability of the user device.

In one example, the second signaling message includes a plurality of fields, similar to the plurality of fields contained in the first signaling message. For instance, the plurality of fields may include a first field that contains data that indicates whether the user device should mute its transmit capabilities, its receive capabilities, or both its transmit capabilities and its receive capabilities. For instance, a first value inserted into the first field may indicate that the transmit capabilities should be muted, a second value inserted into the first field may indicate that the receive capabilities should be muted, and a third value inserted into the first field may indicate that both the transmit capabilities and the receive capabilities should be muted.

The plurality of fields may also include a second field. The second field may contain data that indicates a duration for which the capabilities indicated in the first field should be muted. For instance, a value inserted into the second field may comprise a numeric value that corresponds to a number of symbols (broadly a number of units of time) for which the capability should be muted.

The plurality of fields may also include a third field. The third field may contain data that allows the processing system to verify the authenticity of the second signaling message. For instance, a value inserted into the third field may comprise a predefined value, a key, a hash, or a token that is known to both the processing system and the network element.

In one example, the defined number of symbols may be determined by the network element based on the current level of network traffic and/or on expected usage of the wireless network by the user device for a future period of time (e.g., as determined based on any activities in which the user device is currently engaged in the wireless network and/or on any requests received from the processing system to be put into energy saving mode (e.g., as contained in the first signaling message). In one example, the network element may utilize a machine learning technique (e.g., a support vector machine, a neural network, a decision tree, a linear regression model, or the like) that takes as inputs the current level of network traffic and the expected usage of the wireless network by the user device for a future period of time and generates as an output the defined number of symbols, where the defined number of symbols comprises a number of symbols for which the transmit and/or receive capabilities of the first user device may be muted without the quality of experience of the first user device falling below a predefined threshold quality of experience.

In a further example, the signaling message may further direct the user device to a low frequency band or slice of the wireless network in order to further reduce energy consumption.

In step 314, the processing system may mute, in response to the receiving and for the defined number of symbols, the at least one of: the transmit capability or the receive capability.

That is, the processing system may mute the capability (transmit and/or receive) indicated in the second signaling message (e.g., in the first field) for the number of symbols indicated in the second signaling message (e.g., in the second field). In one example, the capability is muted for no more than the indicated number of symbols; the processing system may unmute the capability once the capability has been muted for the defined number of symbols, unless a further (e.g., third) signaling message is received from the network element indicating that the capability should be muted for an additional number of symbols.

The method 300 may then return to step 304, and the processing system may proceed as described above to continue monitoring the level of network traffic for which a user device is an endpoint and putting the user device into energy saving mode when instructed by the network element.

Thus, the signaling messages of the present disclosure allow a wireless network and user devices connected to the wireless network to share information about levels of network traffic, device-side usage, and the like in order to evaluate when energy may be saved on the network side, the user device side, or both by muting user device transmit and/or receive capabilities. As discussed above, the number of symbols for which to mute the transmit and/or receive capabilities may be dynamically determined and adjusted based on the level of network traffic, which changes over time (and, in some cases, at a sudden and rapid rate).

Moreover, the signaling messages may utilize error detection and correction mechanisms to ensure secure communications between the user devices and the wireless network. In further examples, the sizes of the signaling messages may be minimized, and the timing with which the signaling messages is sent may be optimized, in order to make the most efficient use of bandwidth in the wireless network.

Although not expressly specified above, one or more steps of the method 200 or 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Moreover, it should be noted that when the terms "first," "second," "third," or the like are used herein to refer to items (such as "user devices," "signaling messages," or the like), these terms are meant only to differentiate between two or more different items of the same type. In other words, such terms are not meant to imply that a particular number of items exists or is required for operation of the present disclosure. Nor is a reference to a "second," "third," or the like item meant to imply that a "first," "second," or the like item exists or is required.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, any one or more of the servers 104 or 126 or edge routers 128 or 130 of FIG. 1 (such as might be used to perform the method 200) could be implemented as illustrated in FIG. 4. In another example, one of the user endpoint devices 108, 110, 112, or 114 of FIG. 1 (such as might be used to perform the method 300) could be implemented as illustrated in FIG. 4.

As depicted in FIG. 4, the system 400 comprises a hardware processor element 402, a memory 404, a module 405 for managing energy consumption in a traffic-aware manner, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for managing energy consumption in a traffic-aware manner may include circuitry and/or logic for performing special purpose functions relating to estimating usage of a wireless network by a user device and/or determining periods of time (e.g., numbers of symbols) for which to mute transmit and/or receive capabilities of the user device to conserve energy. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for managing energy consumption in a traffic-aware manner can be loaded into memory 404 and executed by hardware processor element 402 to implement the steps, functions or operations as discussed above in connection with the example methods 200, and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for managing energy consumption in a traffic-aware manner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
monitoring, by a processing system including at least one processor, a level of network traffic in a wireless network to which a plurality of user devices is connected;
detecting, by the processing system based on the monitoring, that a current level of traffic in the wireless network has exceeded a predefined threshold level of traffic;
selecting, by the processing system in response to the detecting, a subset of the plurality of user devices to put into an energy saving mode, wherein at least one user device of the subset is selected for inclusion in the subset based on a determination that an expected usage of the wireless network by the at least one user device for a future period of time falls below a predefined threshold usage; and
sending, by the processing system to each user device in the subset, a signaling message, wherein the signaling message instructs the each user device to mute, for a defined number of symbols, at least one of: a transmit capability of the each user device or a receive capability of the each user device.

2. The method of claim 1, wherein the processing system is part of a network element of the wireless network.

3. The method of claim 1, wherein the signaling message includes a first field that identifies the at least one of: the transmit capability of the each user device or the receive capability of the each user device that is to be muted.

4. The method of claim 3, wherein the signaling message further includes a second field that indicates the defined number of symbols.

5. The method of claim 4, wherein the signaling message further includes a third field that contains data that allows the each user device to verify an authenticity of the signaling message.

6. The method of claim 1, wherein the determination is made based on data contained in another signaling message received from the at least one user device prior to the selecting.

7. The method of claim 6, wherein the another signaling message requests muting of at least one of: a transmit capability of the at least one user device or a receive capability of the at least one user device.

8. The method of claim 7, wherein the another signaling message requests the muting for a requested number of symbols.

9. The method of claim 1, wherein at least another user device of the subset is selected for inclusion in the subset based on a determination that a charge level of the at least another user device for a future period of time falls below a predefined threshold charge level.

10. The method of claim 1, wherein the defined number of symbols is the same for all user devices in the subset.

11. The method of claim 1, wherein the defined number of symbols for a first user device of the subset is different than the defined number of symbols for a second user device of the subset.

12. The method of claim 1, wherein the defined number of symbols is selected by the processing system based on at least one of: a level of transmit activity or a level of receive activity that the each user device is expected to engage in via the wireless network during the future period of time.

13. The method of claim 12, wherein the processing system utilizes a machine learning technique that takes as inputs at least one of: the current level of network traffic, the level of transmit activity, or the level of receive activity that the each user device is expected to engage in via the wireless network during the future period of time and generates as an output the defined number of symbols.

14. The method of claim 13, wherein the defined number of symbols comprises a number of symbols for which the at least one of: the transmit capability of the each user device or the receive capability of the each user device is muted without a quality of experience of the each user device falling below a predefined threshold quality of experience.

15. The method of claim 1, wherein the sending further comprises directing at least one user device of the subset to a frequency band of the wireless network that is of a lower frequency than a frequency band of the wireless network to which the at least one user device is currently connected.

16. The method of claim 1, wherein the sending further comprises directing at least one user device of the subset to a slice of the wireless network that is of a lower priority than a slice of the wireless network to which the at least one user device is currently connected.

17. The method of claim 1, wherein the subset omits user devices of the plurality of user devices that are identified as devices for which a transmit capability and a receive capability are never to be muted.

18. A non-transitory computer-readable medium storing instructions which, when executed by a processing system including at least one processor, cause the processing system to perform operations, the operations comprising:

monitoring a level of network traffic in a wireless network to which a plurality of user devices is connected;

detecting, based on the monitoring, that a current level of traffic in the wireless network has exceeded a predefined threshold level of traffic;

selecting, in response to the detecting, a subset of the plurality of user devices to put into an energy saving mode, wherein at least one user device of the subset is selected for inclusion in the subset based on a determination that an expected usage of the wireless network by the at least one user device for a future period of time falls below a predefined threshold usage; and sending, to each user device in the subset, a signaling message, wherein the signaling message instructs the each user device to mute, for a defined number of symbols, at least one of: a transmit capability of the each user device or a receive capability of the each user device.

18

19. A system comprising:

a processing system including at least one processor; and a non-transitory computer-readable medium storing instructions which, when executed by the processing system, cause the processing system to perform operations, the operations comprising:

monitoring a level of network traffic in a wireless network to which a plurality of user devices is connected;

detecting, based on the monitoring, that a current level of traffic in the wireless network has exceeded a predefined threshold level of traffic;

selecting, in response to the detecting, a subset of the plurality of user devices to put into an energy saving mode, wherein at least one user device of the subset is selected for inclusion in the subset based on a determination that an expected usage of the wireless network by the at least one user device for a future period of time falls below a predefined threshold usage; and sending, to each user device in the subset, a signaling message, wherein the signaling message instructs the each user device to mute, for a defined number of symbols, at least one of: a transmit capability of the each user device or a receive capability of the each user device.

20. The non-transitory computer-readable medium of claim 18, wherein the defined number of symbols for a first user device of the subset is different than the defined number of symbols for a second user device of the subset.

* * * * *